(12) United States Patent
Kawai

(10) Patent No.: US 6,198,342 B1
(45) Date of Patent: Mar. 6, 2001

(54) CHARGE PUMP CIRCUIT SIMPLE IN CONSTRUCTION AND FREE FROM TROUBLE EVEN AT LOW VOLTAGE

(75) Inventor: Ken Kawai, Kyoto-fu (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/456,325

(22) Filed: Dec. 8, 1999

(30) Foreign Application Priority Data

Dec. 8, 1998 (JP) .................................................. 10-348427

(51) Int. Cl.[7] ...................................................... G06F 1/10
(52) U.S. Cl. ........................ 327/536; 327/534; 327/537
(58) Field of Search .................................... 327/534, 536, 327/537; 307/110

(56) References Cited

U.S. PATENT DOCUMENTS

| | | | |
|---|---|---|---|
| 5,029,063 | * 7/1991 | Lingstaedt et al. | 327/536 |
| 5,280,420 | 1/1994 | Rapp . | |
| 5,335,200 | * 8/1994 | Coffman et al. | 327/536 |
| 5,489,870 | * 2/1996 | Arakawa | 327/536 |
| 5,589,793 | * 12/1996 | Kassapian | 327/536 |
| 5,734,290 | * 3/1998 | Chang et al. | 327/536 |
| 5,774,012 | * 6/1998 | Im | 327/536 |
| 5,841,314 | * 11/1998 | Brigati et al. | 327/536 |
| 6,110,557 | * 8/2000 | Hung et al. | 257/299 |

FOREIGN PATENT DOCUMENTS 6-208798     7/1994   (JP) .

* cited by examiner

*Primary Examiner*—Terry D. Cunningham
(74) *Attorney, Agent, or Firm*—Morrison & Foerster, LLP

(57) ABSTRACT

In a charge pump circuit, the issues of increase in loss due to the backgating effect, increase in cost, risks of latch-up and charge leak and the like, which would be involved in achieving voltage reduction, are resolved with a simple circuit structure. A pump cell 31 has nMOS transistors M1–M3 and capacitors C1, C2. An auxiliary capacitor C is connected to an input node IN, and further p-well portions of the nMOS transistors M1–M3 are connected to this auxiliary capacitor C, the nMOS transistor M3 is interposed between each p-well portion and output node OUT, and the input node IN is connected to the gate of the nMOS transistor M3. Thus, with a simple circuit structure which involves only the use of the auxiliary capacitor C, voltage difference of the push-down of the p-well voltage is increased so that the deterioration of pump efficiency due to the backgating effect in the voltage reduction of power supply voltage is eliminated and that latch-up and charge leak are prevented.

10 Claims, 13 Drawing Sheets

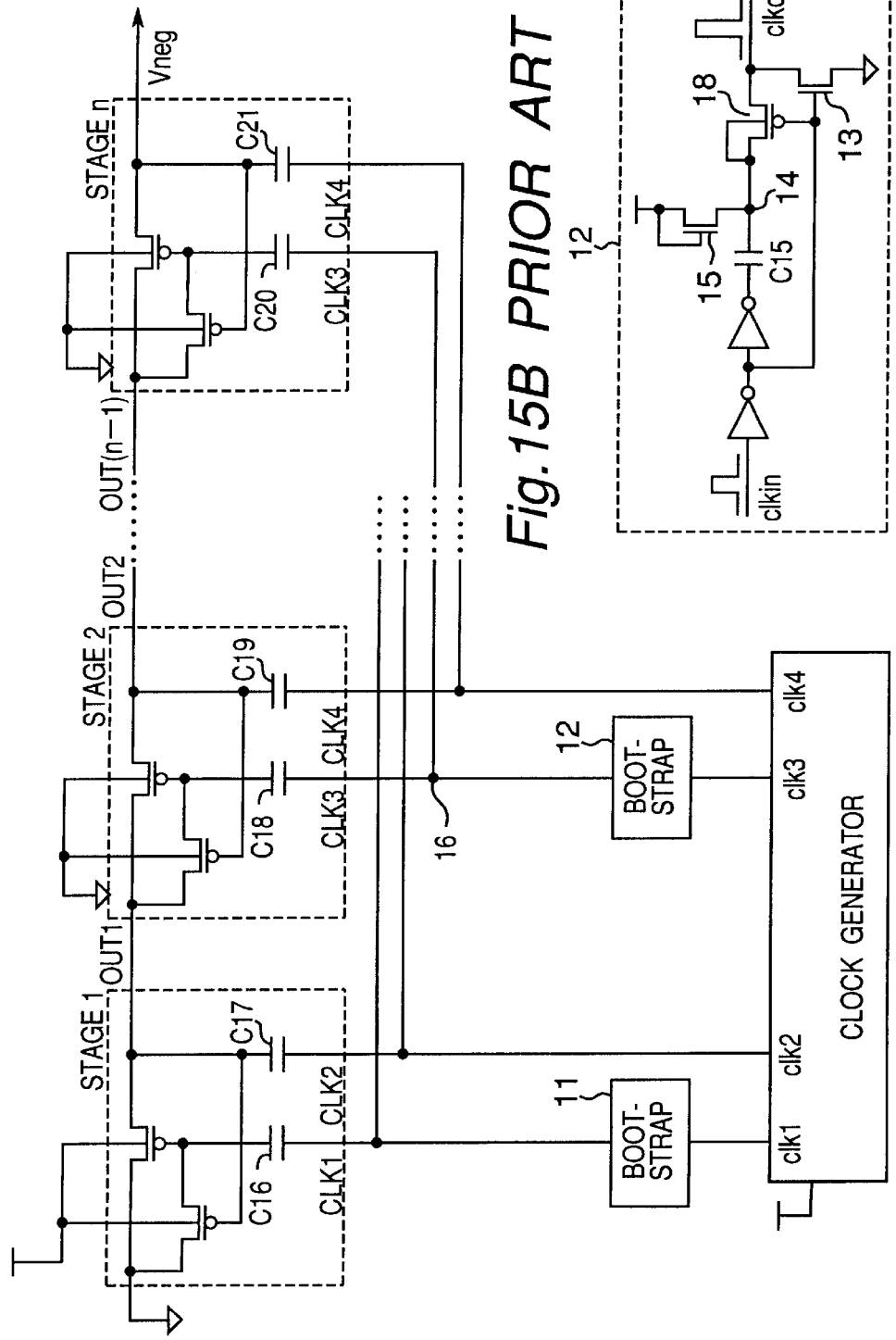
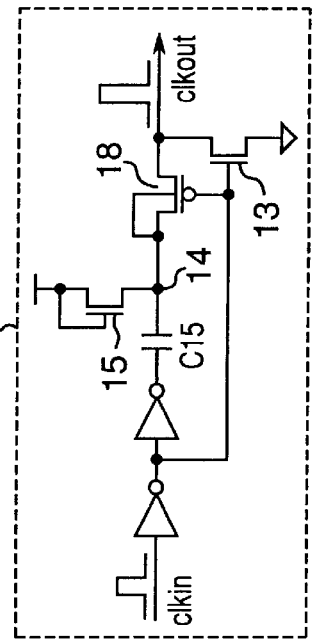
Fig.15A PRIOR ART
Fig.15B PRIOR ART

CHARGE PUMP CIRCUIT SIMPLE IN CONSTRUCTION AND FREE FROM TROUBLE EVEN AT LOW VOLTAGE

BACKGROUND OF THE INVENTION

The present invention relates to a charge pump circuit for generating, for example, write voltage or erase voltage or the like in nonvolatile semiconductor storage devices by boosting or lowering the power supply voltage.

For next-generation flash memories, there is a demand for further lower voltage, smaller power and lower cost (downsizing of circuits) than today's counterparts. In particular, charge pump circuits for generating a high voltage required to write or erase data into or from memory cells occupy a large portion of the chip area, and therefore it is important to implement the size reduction.

The charge pump circuit is a circuit for generating a voltage, or a negative voltage, higher than a power supply voltage by boosting or lowering the power supply voltage. A charge pump for generating a negative voltage to be used for block erasure in NOR flash memories (hereinafter, referred to as negative-voltage charge pump) generates a negative voltage of about −11 V from a power supply voltage (3 V or 5 V). However, with the circuit structure of conventional negative-voltage charge pumps, the circuit would necessarily be upsized acceleratively to obtain the same output from further lower power supply voltages with a view to the voltage reduction, which has been an obstacle to cost reduction.

Conventionally, as one of the circuit structure of the negative-voltage charge pump circuit, there has been a method in which a circuit part for fall of voltage is made up of P-channel transistors. Below given are a brief description of this negative-voltage charge pump using P-channel transistors as well as problems involved in the case where P-channel transistors are used.

An example of the negative-voltage charge pump circuit using P-channel transistors is shown in FIG. 11. In the figure, a portion surrounded by broken line is a pump cell 1 that serves as a basic unit of a charge pump, and a negative-voltage charge pump circuit is made up by connecting several pump cells 1 in series.

Clocks clk1–clk4 as shown in FIG. 12 are inputted to individual clock input terminals CLK1–CLK4 of the pump cells 1. More specifically, clocks clk1, clk2 are inputted to the clock input terminals CLK1, CLK2 of the first-stage pump cell 1, clocks clk3, clk4 are inputted to the clock input terminals CLK3, CLK4 of the second-stage pump cell 1, and clocks clk1, clk2 are inputted to the clock input terminals CLK1, CLK2 of the third-stage pump cell 1. Similarly for the following, clocks clk1, clk2 are inputted to the clock input terminals CLK1, CLK2 of pump cells 1 of odd-numbered stages. By contrast, clocks clk3, clk4 which are shifted 180 degrees with respect to the clocks clk1, clk2 are inputted to the clock input terminals CLK3, CLK4 of pump cells 1 of even-numbered stages.

Now the operation of the pump cell 1 is described by taking a stage 2 in FIG. 11 as an example. Voltage of a node OUT1, which is the input of the stage 2, oscillates at an amplitude of a power supply voltage Vcc generally in synchronization with the clock clk2 as shown by out1 in FIG. 13, by action of a capacitor C4 of the preceding stage 1 and the clock clk2 inputted to this capacitor C4. Meanwhile, voltage of a node OUT2, which is the output of the stage 2, oscillates at the amplitude of the power supply voltage Vcc generally in synchronization with the clock clk4 as shown by out2 in FIG. 13, by action of a capacitor C6 inside the stage 2 and the clock clk4 inputted to this capacitor C6.

Between the node OUT1 and the node OUT2, is provided a transistor M7 having a role of transferring charges between the two nodes OUT1 and OUT2. The voltage of a node B in FIG. 11, when the clock clk4 is an "L" with a transistor M6 conducting, makes a transition at the same voltage as the node OUT1 as shown by broken line B in FIG. 13. In contrast to this, when the clock clk4 is an "H" with the transistor M6 non-conducting, the voltage makes a transition generally in synchronization with the clock clk3 by action of a capacitor C5 connected to the node B and the clock clk3 inputted to this capacitor C5.

Therefore, in the state that the voltage of the node OUT1 has been pushed down by the capacitor C4 and that the voltage of the node OUT2 has been pushed up by the capacitor C6, the node B becomes a voltage lower than the source voltage of the transistor M7 so that the transistor M7 is opened, allowing the charges to be delivered. Then, in any other state, the transistor M7 is closed. Therefore, by making up a negative-voltage charge pump by connecting in series the pump cells 1 having the above construction, a negative voltage Vneg can be taken out.

However, the conventional negative-voltage charge pump circuit has the following problems. That is, the negative-voltage charge pump circuit has a capability of lowering the input voltage by an extent of (Vcc−α) (where α>0) per pump cell 1 of one stage. However, the value of α varies from one pump cell 1 to another due to the voltage inside the pump cell 1. The reason of this is that transfer-use transistors M5, M7, M9 are affected by the backgating effect. For a transistor, the larger the voltage difference between its source and well is, the larger the threshold voltage of the transistor becomes due to the backgating effect. In this case, the P-channel transistors constituting the transfer-use transistors M5, M7, M9 cannot be made be have their n-well portion voltage lower than the substrate voltage (0 V). Meanwhile, the later stage the pump cells 1 belongs to, the lower the source voltage of the transistors M5, M7, M9 becomes. Accordingly, the later the stage in the charge pump is, the larger the voltage difference between source and well becomes so that the influence of the backgating effect increases. That is, if α value of the "i"th-stage pump cell $1_i$ is $α_i$ (i=1, 2, . . . , n), then $$0 \leq α_i \leq α_2 \leq \ldots \leq α_n.$$

Because voltage reduction of the output voltage per pump cell 1 of one stage becomes smaller in later stages of the charge pump, the number of stages of pump cells 1 needs to be increased proportional to the extent of the voltage reduction. Also, the more the power supply voltage lowers, the more the number of stages of pump cells 1 needs to be increased. Unfortunately, however, increasing the number of stages of pump cells 1 would cause the voltage loss due to the backgating effect to increase proportionally as described above, which in turn gives rise to a need for further increasing the number of stages of pump cells 1 in order to make up for the increased voltage loss. Thus, as a result of voltage reduction of the power supply voltage Vcc, the chip area occupied by the charge pump circuit is increased acceleratively.

Also, when the power supply voltage Vcc is lowered as described above, it can occur that at the "i"th-stage pump cell $1_i$, $$Vcc-\alpha_t<0.$$

In this case, no matter how many additional pump cells 1 are connected, the voltage of the output voltage Vneg comes not to lower any more. For example, when Vcc=1.8 V, no matter how many additional pump cells 1 are connected, the output Vneg of the negative-voltage charge pump could be no more than −8 V. Therefore, some devise is needed to generate a high voltage or a negative voltage of large absolute value with a low power supply voltage.

As a solution to the above issue that increasing the number of stages of pump cells would cause the voltage loss due to the backgating effect to increase proportionally, there is a method that the amplitude of the clock clk inputted to the pump cell 1 is made larger than the power supply voltage Vcc by some means, thereby reducing the loss due to the backgating effect.

For example, Japanese Patent Laid-Open Publication HEI 6-208798 has proposed a method for enlarging the clock amplitude of a main pump by means of an auxiliary pump. That is, as shown in FIG. 14, an intermediate voltage higher than a power supply voltage Vcc and lower than an output Vpp is generated by the auxiliary pump 5, and this intermediate voltage is used as power supply for a clock driver 6. Thus, a clock signal larger in amplitude than the power supply voltage Vcc is obtained. Then, by using the clock signal larger in amplitude than the power supply voltage Vcc as a clock signal for the main pump 7, there can be obtained an effect of reducing the number of the stages of pump cells in the main pump 7 and an effect of relatively reducing the voltage loss due to the backgating effect per one-stage pump cell. In this way, the issue of increasing effect of the backgating effect caused by the power supply voltage Vcc being low is avoided.

Further, because an increase in the threshold voltage of the transfer-use transistors M5, M7, M9 matters for the negative-voltage charge pump shown in FIG. 11, there is a method that a bootstrap circuit is added only to clocks of the transfer-use transistors. FIG. 15 shows a negative-voltage charge pump circuit in which bootstrap circuits 11, 12 are connected to the clock input terminals CLK1, CLK2 in the negative-voltage charge pump shown in FIG. 11.

This negative-voltage charge pump shown in FIG. 15A operates as follows. As shown in FIG. 15B, when an input clkin of the bootstrap circuit 12 is at a logical level "L", a transistor 13 conducts so that an output clkout goes 0 V. At the same time, a node 14 is charged up to a voltage of (Vcc−Vthn) (where Vthn: threshold voltage) via a transistor 15. Next, when the logical level of the input clkin goes "H", the transistor 13 goes non-conductive while the node 14 is boosted higher than the power supply voltage Vcc. For example, assuming that the total of the load capacities connected to the node 14 is Cload (Cload=C$_{18}$+ . . . +C$_{20}$) and that the capacitance of a capacitor C15 is C$_{15}$, then the voltage of the node 14 is boosted, according to a capacity ratio between capacitance C$_{15}$ and capacitance Cload in the bootstrap circuit 12, ideally to $$Vcc-Vthn+Vcc \cdot C_{15}/(C_{15}+Cload) \quad (1).$$

This boosted voltage of the node 14 is outputted as a clkout through a transistor 18.

By these operations, when the clock clkin is inputted to the bootstrap circuits 11, 12, a clock made larger in amplitude than Vcc can be taken out. Then, by using this clock clkout, which is larger in amplitude than Vcc as the clock clk given to the transfer-use transistor, influence of the backgating effect can be alleviated proportionally to the amplitude increase of the clock clk. In addition, according to the foregoing Equation (1), the larger the capacitance C$_{15}$ in the bootstrap circuits 11, 12 is made, the greater the amplitude of the clock clkout outputted by the bootstrap circuits 11, 12 becomes, so that the effect of reducing the influence of the backgating effect also becomes greater.

In the two examples described above, the reduction in pump efficiency due to increase in the threshold voltage of the transistors caused by the backgating effect has been resolved. However, in either case, there is a need for adding new circuits for the auxiliary pump 5, the bootstrap circuits 11, 12 and the like. This causes an increase in the circuit area, and moreover an increase in cost, disadvantageously. Both the auxiliary pump 5 and the bootstrap circuits 11, 12 require a capacitor for voltage boost, and this capacitor would produce less effects unless larger in capacity (i.e., larger in area) than the capacitor inside the main pump. Accordingly, the above-described two examples would result in a significant cost increase. Furthermore, in the above two examples, although the influence of the backgating effect can be alleviated, the backgating effect is not eliminated.

As a method for preventing the occurrence of the backgating effect, there is a method that N-channel transistors of the triple-well system are used for the negative-voltage charge pump. FIG. 16 shows a circuit diagram of a negative-voltage charge pump using N-channel transistors of the triple-well system. Now the basic operation of this negative-voltage charge pump is explained according to FIG. 16.

As in the case of a negative-voltage charge pump using P-channel transistors shown in FIG. 11, clocks clk1–clk4 as shown in FIG. 17 are inputted to pump cells 21 surrounded by broken line. Voltage of a node OUT1, which is an input of the stage 2, oscillates at a voltage difference of power supply voltage Vcc generally in synchronization with the clock clk2 as shown by out1 in FIG. 18, by an action of a capacitor C10 of the preceding-stage pump cell 21 and the clock clk2 inputted to this capacitor C10. Meanwhile, voltage of a node OUT2, which is an output of the stage 2, oscillates at a voltage difference of the power supply voltage Vcc generally in synchronization with the clock clk4 as shown by out2 in FIG. 18, by an action of a capacitor C12 and the clock clk4 inputted to this capacitor C12. The voltage of a node C in FIG. 16, when the input signal out1 is at an "H" level with the transistor M12 conducting, makes transition at the same voltage as the node OUT2 as shown by broken line C in FIG. 18. In contrast to this, when the input signal out1 is at an "L" level with the transistor M12 non-conducting, the voltage makes transition generally like the clock clk3 by an action of a capacitor C11 connected to the node C and the clock clk3 inputted to this capacitor C11.

Therefore, in the state that the voltage of the node OUT2 is pushed up by the capacitor C11 and that the voltage of the node OUT1 is pushed down by the capacitor C10, the node C becomes higher in voltage than the source voltage of the transistor M13 so that the transfer-use transistor M13 is opened, allowing the charges to be transferred.

In this negative-voltage charge pump circuit, the p-well voltage for individual transistors is derived from the source. Therefore, the voltage difference between well and source is approximately 0 V so that the backgating effect can be neglected. As a consequence, there occurs no decrease in pump efficiency due to the backgating effect.

However, in this negative-voltage charge pump circuit, in which the p-well voltage of each transistor is simply taken from the source of the same transistor, if a period in which $$V_{source} = V_{pwell} > V_{drain} + V_{bi}$$

(where $V_{bi}$ is a voltage barrier between p-well and source) is present in each transistor within the pump cell 21, then the thyristor structure parasitic within the N-channel transistor goes active, causing a latch-up or charge leak. For example, at a time point $t_B$ in FIG. 18, voltage of out1<voltage of out2, and, for the transistor M13 in FIG. 16, $$V_{source} = V_{pwell} > V_{drain}.$$

Then, while the charge pump circuit is in the steady state, there is a voltage difference of about Vcc on average between the voltage of out1 and the voltage of out2, and both signals out1, out2 are oscillating at a voltage difference of Vcc, respectively. As a result, the value of ($V_{source} - V_{drain}$) at the time point $t_B$ is small, thus making latch-up or charge leak less likely to occur.

At a start-up of the pump, however, because all the nodes are of the same voltage, the value of ($V_{source} - V_{drain}$) is large, making it likely to occur that $V_{source} - V_{drain} > V_{bi}$ at the timing of the time point $t_B$. Accordingly, this negative-voltage charge pump circuit has a large possibility that latch-up or charge leak is caused at a pump start-up, and hence the circuit can be said to be a risky circuit.

As a countermeasure for preventing the occurrence of latch-up or charge leak in the negative-voltage charge pump using N-channel transistors, it is recommendable to ensure that the p-well voltage of each transistor is lower than the drain voltage and the source voltage. One concrete example of this is a negative-voltage charge pump circuit having a constitution shown in FIG. 19.

In the negative-voltage charge pump circuit shown in FIG. 19, pump cells 22 each having a circuit structure shown in FIG. 20 are connected in series so as to make up a main pump 23. Each pump cell 22 is provided with an input terminal WELL for inputting the p-well voltage as shown in FIG. 20, and an output terminal of an auxiliary pump 24 other than the main pump 23 is connected to this input terminal WELL. Then, before driving the main pump 23, the p-well voltage of the N-channel transistor in each of the pump cells 22 constituting the main pump 23 is lowered by the auxiliary pump 24 beforehand. In this way, by ensuring that the p-well voltage is necessarily lower than the drain voltage and the source voltage at a pump start-up, the possibility of latch-up or charge leak is avoided.

It is noted that the auxiliary pump 24 is designed to charge the p-well of each of the pump cells 22 constituting the main pump 23, and therefore does not need to have a current supplying ability. However, in order to securely lower the p-well voltage of the main pump 23, the voltage dropping ability of the auxiliary pump 24 that input the p-well voltage to the succeeding-stage pump cell 22 in the main pump 23 must be higher than the voltage dropping ability of the corresponding pump cell 22 of the main pump 23. For this reason, this negative-voltage charge pump circuit involves safe but relatively large-scaled additional circuits (auxiliary pumps 24), causing the circuit area to increase and inevitably involving a cost increase.

As described above, such a conventional negative-voltage charge pump circuit as shown in FIG. 11 has a problem that making the power supply voltage lower causes the loss due to the backgating effect to relatively increase so that the charge pump efficiency lowers. Although various types of negative-voltage charge pump circuits as described above have been available to avoid this problem, none of those circuits cannot afford to resolve the two issues of "cost increase" and "risks of latch-up and charge leak".

SUMMARY OF THE INVENTION

Therefore, an object of the present invention is to provide a charge pump circuit which is capable of resolving the issues of "increase in loss due to the backgating effect", "increase in cost", "risks of latch-up and charge leak" and the like, which would be involved in achieving lower voltage with a simple circuit structure.

In order to achieve the above object, according to the present invention, there is provided a charge pump circuit having a plurality of pump cells connected in series, wherein a pump cell of an odd-numbered stage executes a charge pump operation for an input voltage based on a first clock signal and a second clock signal while a pump cell of an even-numbered stage executes a charge pump operation based on a third clock signal and a fourth clock signal so that an output voltage resulting from boosting the input voltage is obtained, the pump cell being characterized in that:
drain of a first transistor and gate of a second transistor are connected to an input node;
source of the first transistor, source of the second transistor and one electrode of a first capacitor are connected to an output node;
drain of the second transistor and one electrode of a second capacitor are connected to a node connected to gate of the first transistor;
a clock input node to which one of the clock signals, whichever it is, is inputted is connected to the other electrodes of the first capacitor and the second capacitor;
one electrode of a third capacitor is connected to the input node;
a well portion of each transistor is connected to the other electrode of the third capacitor; and that
the pump cell is equipped with switching means for electrically connecting or cutting off the well portion and the output node to or from each other.

With this constitution, when the voltage difference between input node and output node becomes a specified voltage difference, the second transistor is turned off by an input signal from the input node. Then, by the action of the second capacitance connected to a gate of the first transistor via the node as well as a clock signal inputted to this second capacitance, the first transistor is turned on. Thus, the input node and the output node are electrically connected to each other, allowing the charges to be delivered between the two nodes.

Also, when the voltage difference between source and drain voltage and well voltage of each transistor becomes a specified voltage difference, the well portion and the output node are electrically cut off by the switching means, putting the well portion into a floating state. In this occurrence, by the capacitance value of the third capacitance being set to an optimum value, the relation of magnitude between the well portion voltage and the source and drain voltage of the transistor is set to a specified one.

In one embodiment of the invention, the pump cell further comprises:

voltage setting means for setting the input node, the output node, the node and the well portion to the same voltage when the charge pump circuit is out of operation.

With this constitution, the input node, output node and node and well portions become identical in voltage level immediately after the operation start of the charge pump circuit. Therefore, the specified voltage differences and the magnitude correlation are correctly set when the charge pump circuit is operated.

In one embodiment, the transistors constituting the pump cell are nMOS transistors.

With this constitution, during the oscillation of the input node and the output node based on the clock signal, when the voltage of the input node lowers and the voltage of the output node rises so that (voltage of the input node)—(voltage of the output node) becomes smaller than the specified voltage difference, the second transistor is turned off. Then, after the charges are delivered between the input node and the output node as described above, the voltage of the input node rises while the voltage of the output node lowers. In this way, the voltage of the output node is maintained lower than the voltage of the input node. Thus, the charge pump circuit functions as a negative-voltage charge pump circuit.

In one embodiment, the switching means operates in such a manner that:

when the voltage of the output node of the pump cell is lower than the voltage of the input node, the switching means electrically connects the well portion and the output node to each other; and when the voltage of the output node of the pump cell is higher than the voltage of the input node, the switching means electrically cuts off the well portion and the output node from each other so that the well portion is brought into a floating state.

With this constitution, the voltage of the well portion that has come into a floating state when the voltage is higher than the source and drain voltage of all the transistors is set lower than the voltage of the source and drain voltage by a push-down of the input signal. Thus, the voltage of the well portion is maintained lower than the source and drain voltage of all the nMOS transistors constituting the pump cells. Also, the voltage difference between the voltage of the well portion and the voltage of the source is small. Therefore, the occurrence of the backgating effect of each transistor which matters in implementing the voltage reduction of the power supply voltage is suppressed.

Also, in one embodiment, a capacitance value of the third capacitor is so set that the voltage of the well becomes lower than the voltage of source and drain of all the transistors constituting the pump cell regardless of what is operational state of the pump cell.

With this constitution, even immediately after the charge pump circuit has started up or even while the charge pump circuit is in the steady-state operation, there never occurs any latch-up or charge leak in each nMOS transistor.

Also, in one embodiment, the transistors constituting the pump cell are pMOS transistors.

With this constitution, during the oscillation of the input node and the output node based on the clock signal, when the voltage of the input node rises and the voltage of the output node lowers so that (voltage of the output node)—(voltage of the input node) becomes smaller than the specified voltage difference, the second transistor is turned off. Then, after the charges are delivered between the input node and the output node as described above, the voltage of the input node lowers while the voltage of the output node rises. In this way, the voltage of the output node is maintained higher than the voltage of the input node. Thus, the charge pump circuit functions as a positive-voltage charge pump circuit.

Also, in one embodiment, the switching means operates in such a manner that:

when the voltage of the output node of the pump cell is higher than the voltage of the input node, the switching means electrically connects the well portion and the output node to each other; and when the voltage of the output node of the pump cell is lower than the voltage of the input node, the switching means electrically cuts off the well portion and the output node from each other so that the well portion is brought into a floating state.

With this constitution, the voltage of the well portion that has come into a floating state when the voltage is lower than the source and drain voltage of all the transistors is set higher than the voltage of the source and drain voltage by a push-up of the input signal. Thus, the voltage of the well portion is maintained higher than the source and drain voltage of all the pMOS transistors constituting the pump cell. Also, the voltage difference between the voltage of the well portion and the voltage of the source is small. Therefore, the occurrence of the backgating effect of each transistor which matters in implementing the voltage reduction of the power supply voltage is suppressed.

Also, in one embodiment, a capacitance value of the third capacitor is so set that the voltage of the well becomes higher than the voltage of source and drain of all the transistors constituting the pump cell regardless of what is operational state of the pump cell.

With this constitution, even immediately after the charge pump circuit has started up or even while the charge pump circuit is in the steady-state operation, there never occurs any latch-up or charge leak in each pMOS transistor.

Also, in one embodiment, at least one pump cell among the pump cells connected in series is connected in parallel with another pump cell having the same structure.

With this constitution, by connecting the pump cells in parallel, increase in the current supplying ability or reduction in output impedance can be achieved.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 15A is a circuit diagram of a negative-voltage charge pump circuit according to the prior art other than those of FIGS. 11 and 14, and FIG. 15B is a circuit diagram of a bootstrap in FIG. 15A;

DETAILED DESCRIPTION OF THE PREFERRED EMBODIMENTS

Hereinbelow, the present invention is described in detail by embodiments thereof illustrated in the accompanying drawings.

First Embodiment

Figure 1:
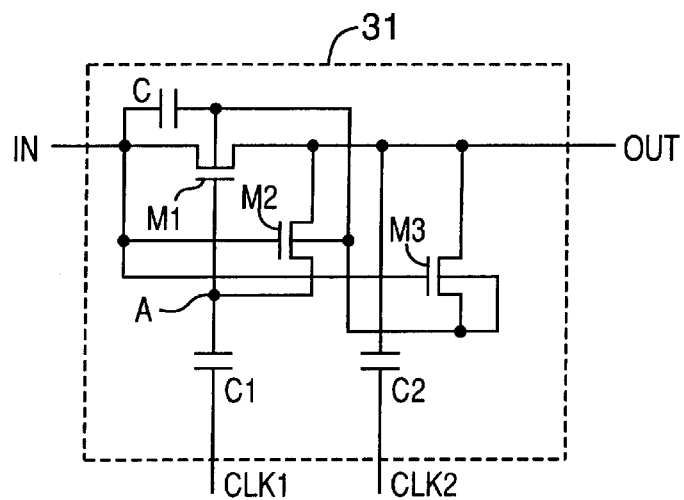
FIG. 1 is a circuit structure diagram of a pump cell to be used in a charge pump circuit of the present invention.
Figure 2:
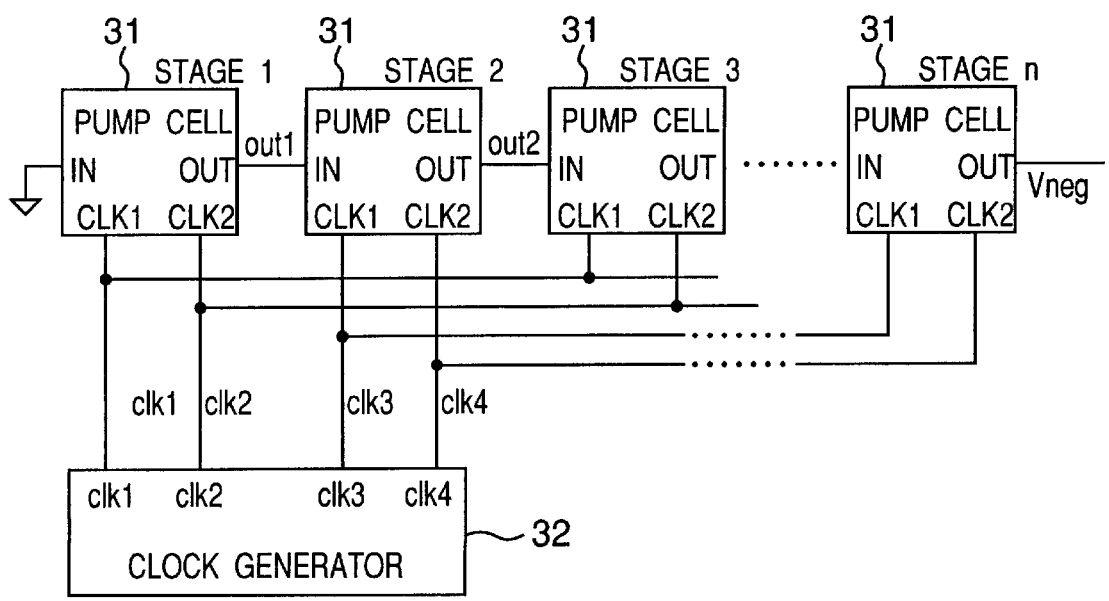
FIG. 2 is a circuit diagram of a negative-voltage charge pump circuit using the pump cell shown in FIG. 1.

FIG. 2 is a circuit diagram of a charge pump circuit according to this embodiment. FIG. 1 shows a detailed structure of a pump cell 31 of FIG. 2.

The charge pump circuit of this embodiment, as shown in FIG. 2, has n-stage pump cells 31 in series to obtain a negative voltage Vneg from a reference voltage (0 V). Referring to FIG. 2, an input node IN of a left-end positioned first-stage pump cell (stage 1) 31 is connected to the reference voltage (0 V). An output node OUT, on the other hand, is connected to the input node IN of the second-stage pump cell (stage 2) 31. An output node OUT of the second-stage pump cell 31 is connected to an input node IN of a third-stage pump cell (stage 3) 31. Hereinbelow, likewise, individual pump cells 31 are connected in the same manner, so that the negative voltage Vneg is outputted from the output node OUT of the n-stage pump cell (stage n) 31.

Figure 3:
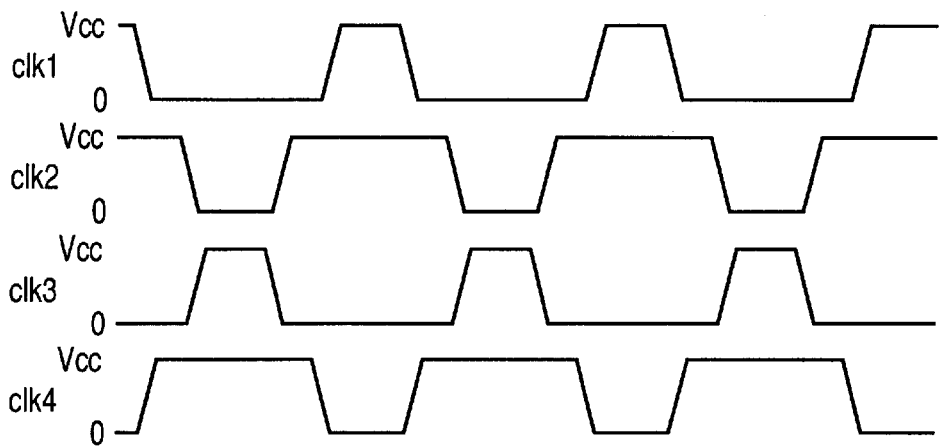
FIG. 3 is a diagram showing waveforms of clock signals fed to the charge pump circuit shown in FIG. 2.

Next, a clock generator 32 generates four types of clock signals clk1–clk4 as shown in FIG. 3. The clock signals clk1, clk2 are inputted to the clock input nodes CLK1, CLK2 of pump cells 31 of odd-numbered stages. Also, the clock signals clk3, clk4 are inputted to the clock input nodes CLK1, CLK2 of pump cells 31 of even-numbered stages. It is noted that the generation of these clock signals, which has been described also in the paragraphs for the prior art, is an already known technique and so its description is omitted here.

As shown in FIG. 1, the input node IN of the pump cell 31 is connected to drain of an nMOS (metal oxide semiconductor) transistor M1, gate of an nMOS transistor M2, gate of an nMOS transistor M3 and one electrode of an auxiliary capacitor C. Also, source of the nMOS transistor M1, source of the nMOS transistor M2, source of the nMOS transistor M3 and one electrode of a capacitor C2 are connected to the output node OUT.

The other electrode of the capacitor C2 is connected to the clock input node CLK2. Also, the gate of the nMOS transistor M1 is connected to the drain of the nMOS transistor M2 and one electrode of a capacitor C1. The other electrode of the capacitor C1 is connected to the clock input node CLK1. Further, the drain of the nMOS transistor M3 is connected to the other electrode of the auxiliary capacitor C, p-well portion of the nMOS transistor M1, p-well portion of the nMOS transistor M2 and p-well portion of the nMOS transistor M3 itself.

The charge pump circuit of this structure operates as follows. It is noted that the pump cells 31 of the individual stages in the charge pump circuit of this embodiment are identical in structure and operation to one another and so the description is typified by the operation of the second-stage pump cell (stage 2) 31.

To the input node IN of this cell 31, is inputted an output signal out1 outputted from the preceding-stage (first-stage) pump cell (stage 1) 31. Since this pump cell 31 is located at an even-numbered stage, a clock signal clk3 is inputted to the clock signal clk1, and a clock signal clk4 is inputted to the clock input node CLK2.

Figure 4A:
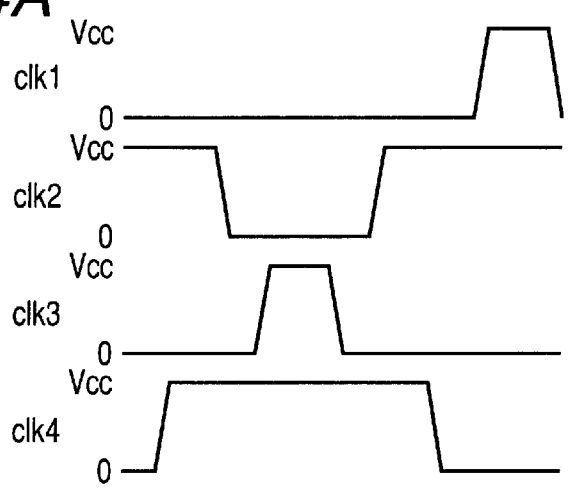
FIGS. 4A, 4B are diagrams showing voltage waveforms of individual nodes in FIG. 1.
Figure 4B:
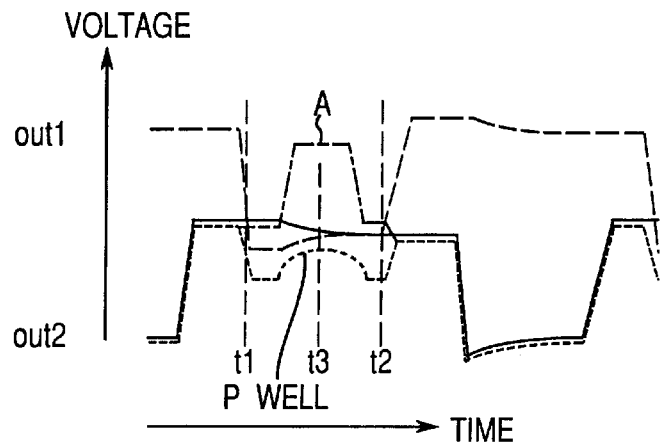

Now, the signal out1 inputted to the input node IN oscillates generally in synchronization with the clock signal clk2, as shown in FIGS. 4A and 4B, by the action of the capacitor C2 within the preceding-stage pump cell (stage 1) 31 and the clock signal clk2 inputted to this capacitor C2 (where the clock signal clk2 is inputted to the clock input node CLK2 because the preceding-stage pump cell is located in an odd-numbered stage). With parasitic capacity of the transistors disregarded, the voltage difference of this oscillation can be expressed, for the pump cell 31 in its steady state, by Equation (2):

$$(C2/(2C+C2))\times Vcc \qquad (2)$$

where C: capacitance value of auxiliary capacitor C

C2: capacitance value of capacitor C2.

Meanwhile, an output signal out2 is outputted from the output node OUT. This output signal out2 is oscillated generally in synchronization with the clock signal clk4 as shown in FIGS. 4A and 4B by the action of the capacitor C2 within the pump cell (stage 2) 31 and the clock signal clk4 inputted to this capacitor C2. The voltage difference of this oscillation is expressed, for the pump cell 31 in its steady state, by the above Equation (2), as in the case of the signal out1.

The nMOS transistor M2, to the gate of which the signal out1 is inputted, comes to conduct when the voltage of the input node IN (that is, the voltage of signal out1 in FIG. 4B) is higher than the voltage of the output node OUT (that is, voltage of the signal out2 in FIG. 4B), and remains non-conducting during the other periods. That is, the nMOS transistor M2 is non-conducting during a period from time $t_1$ to time $t_2$, and is conducting during the other periods in FIG. 4B. Then, during a period in which the nMOS transistor M2 is conducting, the voltage of the node A in FIG. 1, given that the ON-resistance of the nMOS transistor M2 is disregarded, transits at the same voltage as the output signal (signal out2) of the output node OUT as shown in FIG. 4B.

Meanwhile, during a period in which the nMOS transistor M2 is non-conducting (from time $t_1$ to time $t_2$), the node A comes into a floating state. However, by the action of the capacitor C1 connected to the node A and the clock signal clk3 inputted to this capacitor C1, the voltage of the node A is pushed up when the logical level of the clock signal clk3 goes "H" (level of Vcc) as shown in FIG. 4B. Thus, when the voltage of the node A is pushed up, the gate voltage of the nMOS transistor M1 rises, so that the nMOS transistor M1 conducts. Then, by this conduction of the nMOS transistor M1, the two nodes IN and OUT are equalized to each other. As a result, as shown in FIG. 4B, the signal out1 and the signal out2 become generally equal in voltage to each other during a period in which the clock clk3 is at an "H" level (a period in which the voltage of the node A remains pushed up).

Then, during this conductive period of the nMOS transistor M1 in which the signal out1 and the signal out2 are generally equal in voltage to each other, the voltage of the input node IN (voltage of the signal out1) is the lowest and the voltage of the output node OUT (voltage of the signal out2) is the highest. Accordingly, from the above fact, the average voltage of the output node OUT (average voltage of signal out2) throughout the entire period is lower than the average voltage of the input node IN (average voltage of signal out1) by the voltage difference shown by Equation (2). Thus, the voltage of the signal out1 inputted to the input node IN is lowered to the voltage of the signal out2 and outputted from the output node OUT.

Next, transition of the p-well voltage of the nMOS transistors M1, M2, M3 is explained. During a period other than the period of time $t_1$ to time $t_2$, because the voltage of the input node IN (voltage of signal out1, or gate voltage of the NMOS transistor M3 as well) is higher than the voltage of the output node OUT (voltage of the signal out2), the nMOS transistor M3 conducts. As a result, given that the ON-resistance of the nMOS transistor M3 is disregarded, the p-well voltage of the nMOS transistors M1, M2, M3 transits at the same voltage as the voltage of the output node OUT as shown in FIG. 4B.

Meanwhile, during the period of time $t_1$ to time $t_2$, because the voltage of the input node IN (voltage of the signal out1, or the gate voltage of the nMOS transistor M3 as well) is lower or equal to the voltage of the output node OUT (voltage of the signal out2), the nMOS transistor M3 comes to be non-conducting. As a result, the p-well portions of the nMOS transistors M1, M2, M3 come into a floating state. In addition, the voltage of the p-well portions during this period is determined as follows.

At the time point $t_1$, the input signal (signal out1) of the input node IN is pushed down. Then, this signal out1 is an output of the preceding-stage pump cell (stage 1) 31 and outputted in synchronization with the clock signal clk2. The voltage of the p-well portions is pushed down by the push-down of the signal out1, and by the action of a capacitance between p-well and drain of the nMOS transistor M1, a capacitance between p-well and gate of the nMOS transistor M2, a capacitance between p-well and gate of the nMOS transistor M3, and the auxiliary capacitor C.

After that, the voltage of the p-well portions is pushed up by an increase in the voltage of the node A attributable to a rise of the clock signal clk3, and by the action of the capacitance between p-well and gate of the nMOS transistor M1 and the capacitance between p-well and drain of the nMOS transistor M2.

Next, as the clock signal clk3 falls, the voltage of the node A also lowers, and the voltage of the p-well is lowered by the action of the capacitance between p-well and gate of the nMOS transistor M1 and the capacitance between p-well and drain of the nMOS transistor M2. Finally, at the time point $t_2$, the voltage of the input node IN (voltage of the signal out1) rises in synchronization with the clock signal clk2, where when the voltage becomes higher than the voltage of the output node OUT (voltage of the signal out2), the nMOS transistor M3 conducts, so that the voltage of the p-well portion becomes equal to the voltage of the output node OUT (voltage of the signal out2).

In the above sequence of processes, if the voltage of the p-well portions of the nMOS transistors M1, M2, M3 should become higher than $(V_{drain}+V_{bi})$ and $(V_{source}+V_{bi})$, a latch-up or charge leak would be caused as described before, and such an occurrence must be avoided. It is noted that $V_{bi}$ is a voltage barrier between p-well and source.

The auxiliary capacitor C of the pump cell 31 in this embodiment has a role of enlarging the voltage difference for the push-down of the p-well voltage at time $t_1$. Therefore, the larger the capacitance value of the auxiliary capacitor C is made, the larger the push-down voltage of the p-well portion becomes. On the other hand, however, the larger the capacitance value of the auxiliary capacitor C is made, the smaller the absolute value of the output voltage becomes as can be seen from Equation (2). This being the case, the capacitance value of the auxiliary capacitor C is set to a minimum magnitude required to make the voltage difference between p-well and signal out1 at the time point $t_1$ when the p-well voltage is pushed up larger than the voltage difference of the push-up of the p-well voltage at a time point $t_3$. By so doing, the constraints for the p-well voltage can necessarily be satisfied, making it possible to make up a charge pump circuit which is free from the latch-up or charge leak and which is safe and highly reliable.

Hereinbelow, the above description is verified in more detail. In a circuit construction of the pump cell 31 shown in FIG. 1, the capacitance between p-well and source, the capacitance between p-well and drain and the capacitance between p-well and gate of the nMOS transistor M1 are assumed to be $C_{BS1}$, $C_{BD1}$, $C_{BG1}$, respectively. Similarly, the capacitances for the nMOS transistor M2 are assumed to be $C_{BS2}$, $C_{BD2}$, $C_{BG2}$, respectively, and the capacitances for the nMOS transistor M3 are $C_{BS3}$, $C_{BD3}$, $C_{BG3}$, respectively. In addition, because the capacitance between p-well and n-well in the nMOS transistors M1, M2, M3 is very small and so neglected here. In this case, although the n-well portion is not depicted in FIG. 1, the nMOS transistor in FIG. 1 is formed into a triple-well structure by building up an n-well portion on a p-type substrate and building up a p-well portion of the nMOS transistor on the n-well portion.

Further, it is assumed that, for the nMOS transistor M1, the total of capacitances as viewed from the gate is CG1, the total of capacitances as viewed from the drain is CD1 and that the total of capacitances as viewed from the source is CS1. Likewise, it is assumed that the totals of capacitances associated with the nMOS transistor M2 are CG2, CD2 and CS2, respectively, and that the totals of capacitances associated with the nMOS transistor M3 are CG3, CD3 and CS3, respectively.

Figure 5:
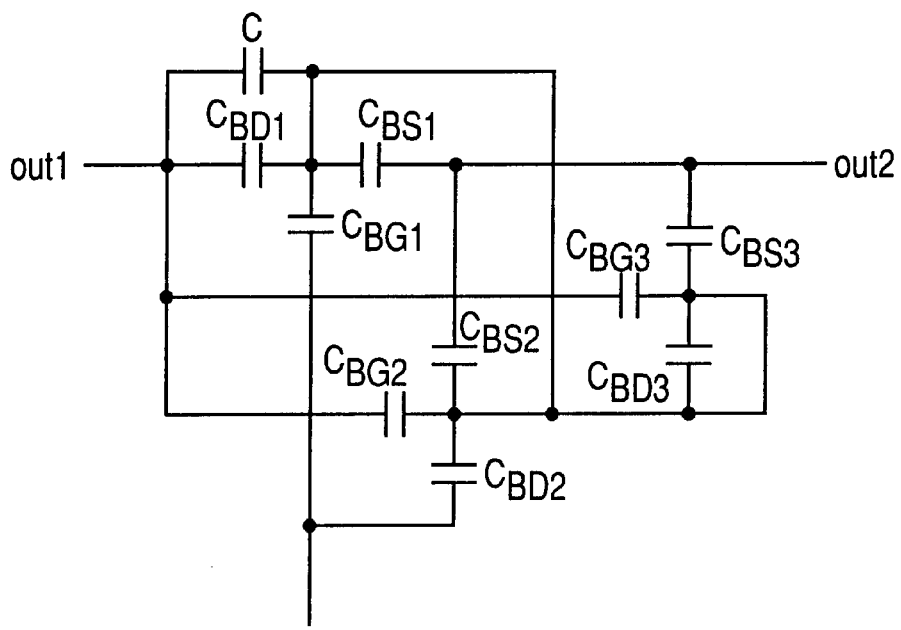
FIG. 5 is a capacitance model diagram of the pump cell shown in FIG. 1.
Figure 6:
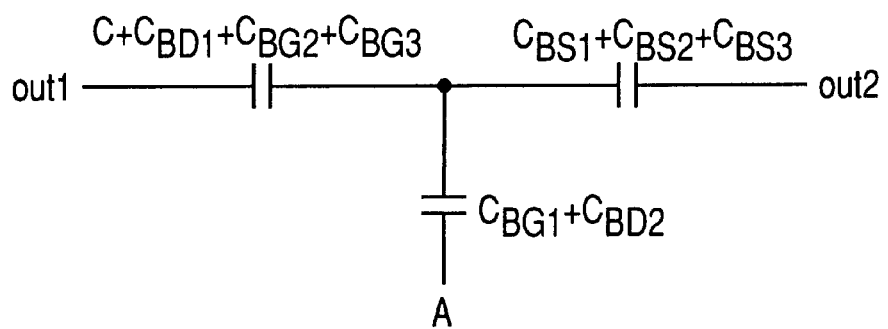
FIG. 6 is an equivalent circuit diagram of the capacitance model shown in FIG. 5.

Each of the above-set parasitic capacitances of the pump cell 31 in FIG. 1 can be approximated by a capacitor model shown in FIG. 5, as model for deciding the p-well voltage during a period in which the nMOS transistor M3 is non-conducting, i.e., a period of time $t_1$ to time $t_2$. This can be further converted into an equivalent circuit shown in FIG. 6.

Now, in a state of voltage transition inside the pump cell as shown in FIG. 4B, conditions for preventing the p-well voltage from going higher than ($V_{drain}+V_{bi}$) or ($V_{source}+V_{bi}$) are determined.

On the way on which the input signal (signal out1) of the input node IN falls, the nMOS transistor M3 becomes non-conducting, so that the p-well portion comes into a floating state. Then, a voltage difference to which the input signal (signal out1) of the input node IN further falls after the p-well portion has come into the floating state is assumed to be $V_{s1}$. Also, a voltage difference between the output signal (signal out2) of the output node OUT and the input signal (signal out1) of the input node IN after the input signal (signal out1) of the input node IN has fallen is assumed to be $V_1$. Further, the amplitude of the voltage at the node A is assumed to be $V_{S2}$.

Here, the aforementioned conditions can be satisfied if the voltage of the p-well portion at time $t_3$ is lower than (voltage of signal out1+$V_{bi}$), and this condition can be approximated by Equation (3):

$$(-C23/Ctot) \times V_{S1} + (C24/Ctot) \times V_{S2<-V1} + V_{bi} \qquad (3)$$

where $$C23 = C + C_{BD1} + C_{BG2} + C_{BG3}$$

$$C24 = C_{BG1} + C_{BD2}$$

$$C25 = C_{BS1} + C_{BS2} + C_{BS3}$$

$$Ctot = C23 + C24 + C25.$$

Further, a capacitance value of the auxiliary capacitor C in the case where, for example, the values of individual variables are as shown below is calculated:

$$V_{bi} = 0.6 \text{ [V]},$$

where $V_{bi}$ is the voltage barrier between p-well and source;

$$C_{BG1} = 50 \text{ [fF]}$$

$$C_{BD1} = C_{BS1} = 15 \text{ [fF]}$$

$$C_{BG2} = 25 \text{ [fF]}$$

$$C_{BD2} = C_{BS2} = 7.5 \text{ [fF]}$$

$$C_{BG3} = 15 \text{ [fF]}$$

$$C_{BD3} = C_{BS3} = 4.5 \text{ [fF]}$$

$$CG1 = 60 \text{ [fF]}$$

$$CD1 = 20 \text{ [fF]}$$

$$CG2 = 30 \text{ [fF]}$$

$$CD2 = 10 \text{ [fF]}$$

$$CG3 = 17.5 \text{ [fF]}$$

$$C1 = 500 \text{ [fF]},$$

where C1 is the capacitance value of the capacitor C1, and $$C2 = 5000 \text{ [fF]},$$

where C2 is the capacitance value of the capacitor C2.

First, a case where the charge pump circuit is in the steady state is discussed. In the steady state, the following conditions are obtained:

$$V_1 = 0 \text{ [V]}$$

$$V_{S1} = V_{thn} = 0.6 \text{ [V]},$$

where $V_{thn}$ is the threshold voltage of the transistors M1, M2, M3, $$V_{S2} = \{(C1/(C1+CG1+CD2)\} \times Vcc$$

Accordingly, given that Vcc=1.8 [V], substituting the values of variables and the conditions as described above yields a value of the auxiliary capacitor C satisfying that $$C > -21.6 \text{ [fF]} \qquad (4)$$

This result represents that the auxiliary capacitor C is unnecessary when only the steady state is considered.

Next, a case where the charge pump circuit is in the state immediately after a start-up of the charge pump circuit is discussed. In this case, taking into consideration that all the nodes are of the same voltage at a start-up of the charge pump circuit, a case where the voltage of the input node IN (voltage of signal out1) and the voltage of the output node OUT (voltage of signal out2) are of the same voltage immediately after the time $t_1$, and further a case where the voltage of the input node IN (voltage of signal out1) falls are discussed.

In this case, the following conditions are obtained:

$$V_{S1} = V_1 = \{C2/(C2+C26)\} \times Vcc$$

$$V_{S2} = \{C1/(C1+CG1+CD2)\} \times Vcc$$

where $C26 = CG1 + CD1 + 2CG2 + 2CG3 + 2C$.

Accordingly, given that Vcc=1.8 [V], substituting the values of variables and the conditions as described above into Equation (3) yields a value of the auxiliary capacitor C satisfying that $$C > 236.3 \text{ [fF]}$$

From the above results, in this embodiment, if the value of the auxiliary capacitor C is limited to 236.3 [fF] or more, then the voltage of the p-well portion is lower than ($V_{drain}+V_{bi}$) or ($V_{source}+V_{bi}$) not only in the steady state but also at the time of start-up, so that the latch-up or charge leak never occurs.

When pump cells 31 each having a circuit structure of FIG. 1 in which the auxiliary capacitor C having such a capacitance value as determined above is built are connected in series as shown in FIG. 2 to make up a charge pump circuit, a desired negative voltage Vneg can be obtained from the output node OUT of the final-stage pump cell 31.

For example, in the case where the charge pump circuit is made up by connecting the pump cells 31 in series to n stages, a negative voltage Vneg of $$\{-C2/(2C+C1)\} \times Vcc \times n$$

can be obtained from the output node OUT of the "n"th-stage pump cell 31 according to Equation (2).

As shown above, in this embodiment, the pump cell 31 of which the charge pump circuit is made up is structured as follows. That is, the drain of the nMOS transistor M1 and the gate of the nMOS transistor M2 are connected to the input node IN. Also, the source of the nMOS transistor M1, the source of the nMOS transistor M2 and one electrode of the capacitor C2 are connected to the output node OUT. Also, the gate of the nMOS transistor M1, the drain of the nMOS transistor M2 and one electrode of the capacitor C1 are connected to the node A. Also, the clock terminal is connected to the other electrodes of the capacitor C1 and the capacitor C2.

Therefore, the voltage of the node A is pushed up by the nMOS transistor M2 and the capacitor C1, if the voltage of the output signal out1 from the preceding stage to the input node IN is lower than the voltage of the output signal out2 from the output node OUT to the succeeding stage and if the clock signal is inputted to the capacitor C1. Then, the push-up of the voltage of the node A causes the nMOS transistor M1 to turn on, allowing the charges to be transferred from the input node IN to the output node OUT.

Further, one electrode of the auxiliary capacitor C is connected to the input node IN, and the p-well portions of the transistors M1, M2, M3 are connected to the other electrode of the auxiliary capacitor C. Furthermore, the nMOS transistor M3 as a switching means is interposed between the p-well portions and the output node OUT, and the input node IN is connected to the gate of this nMOS transistor M3.

Therefore, the voltage of the p-well portions of the nMOS transistors M1, M2, M3 is put into floating state by the nMOS transistor M3 if the voltage of the output signal out1 is lower than the voltage of the output signal out2. In such a case, by optimally determining the capacitance of the auxiliary capacitor C set between the input node IN and the p-well portion according to the foregoing Equation (3), the voltage difference of the push-up of the p-well portion based on the push-down of the voltage of the output signal out1 can be enlarged so that the voltage of the p-well portion can be lower than $(V_{drain}+V_{bi})$ and $(V_{source}+V_{bi})$ regardless of whether the charge pump circuit is at a start-up or in the steady state. As a result, the latch-up or charge leak never occurs. Also, since the voltage difference between p-well voltage and source voltage in the nMOS transistor M1 can be suppressed to a minimum, influence of the backgating effect on the reduction of the pump efficiency can be almost entirely suppressed in conjunction with the implementation of lowering of the power supply voltage.

Figure 19:
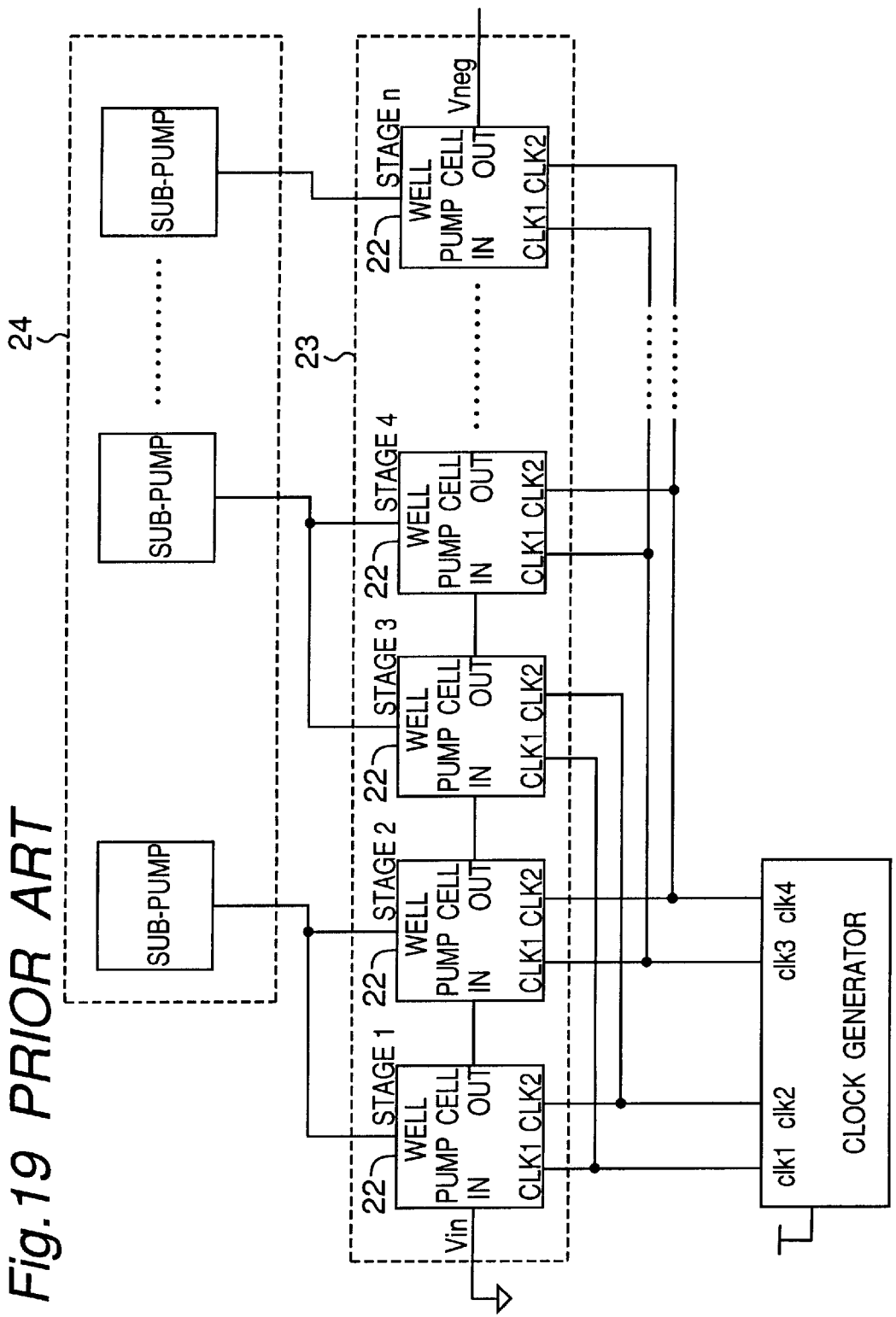
FIG. 19 is a circuit diagram of a negative-voltage charge pump circuit using N-channel transistors according to the prior art other than that of FIG. 16.
Figure 20:
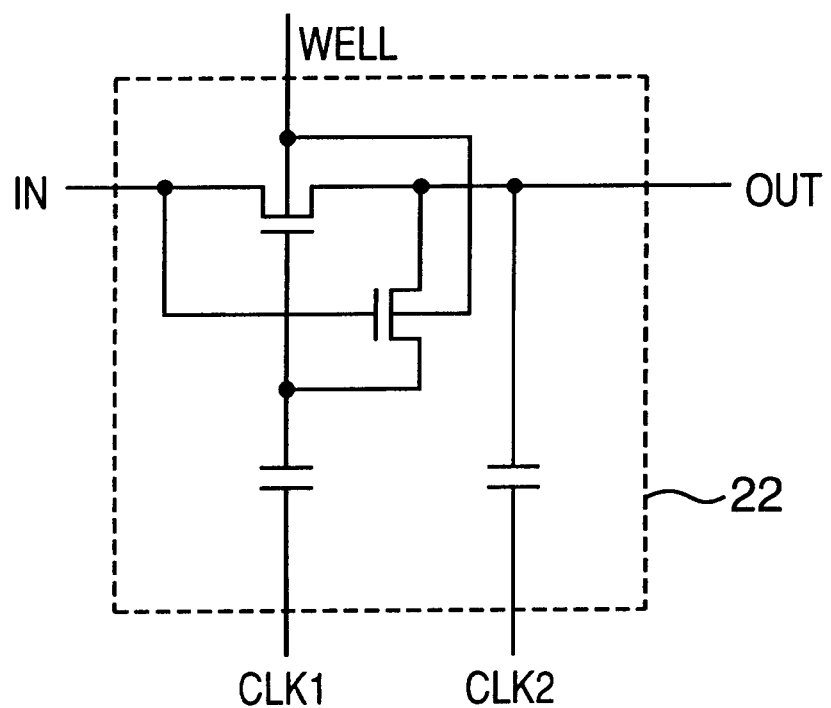
FIG. 20 is a circuit structure diagram of the pump cell in FIG. 19.

Like this, in this embodiment, without the need for such a large-scale additional circuit as the auxiliary pump 24 for lowering the p-well voltage of the N-channel transistors, which would be involved in the negative-voltage charge pump circuit using N-channel transistors shown in FIG. 19, the risk of latch-up and charge leak can be avoided with a simple circuit structure in which the auxiliary capacitor C is interposed between the input node IN and the p-well portions of the N-channel transistors M1, M2, M3.

Second Embodiment

Figure 7:
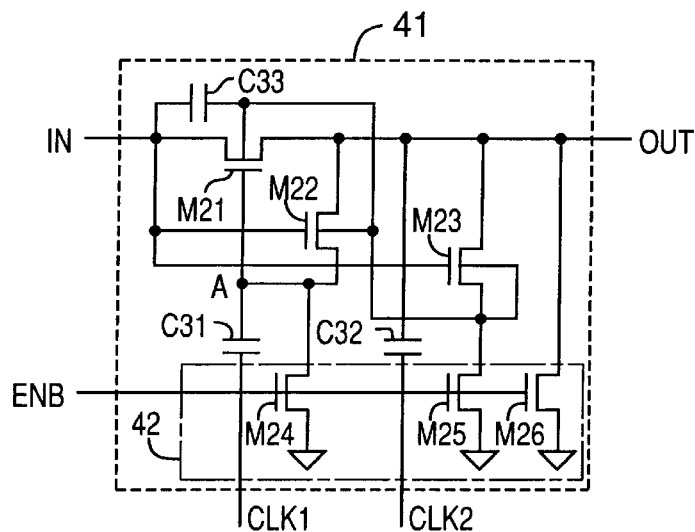
FIG. 7 is a circuit structure diagram of a pump cell other than that of FIG. 1.

FIG. 7 is a circuit diagram of a pump cell constituting a charge pump circuit of this embodiment. A pump cell 41 in this embodiment is one in which a node reset circuit 42 is added to the pump cell 31 of the first embodiment shown in FIG. 1.

nMOS transistors M21–M23, capacitances C31, C32 and C33 are connected in the same manner as the nMOS transistors M1, M2, M3, the capacitors C1, C2 and the auxiliary capacitor C are in FIG. 1, and operate in the same manner. The node reset circuit 42 is made up of three nMOS transistors M24, M25, M26 and the like.

Hereinbelow, the section of the node reset circuit 42 is explained mainly. The source of the nMOS transistor M24 is connected to the node A (corresponding to the node A of the pump cell 31 shown in FIG. 2), while the drain is connected to the reference voltage (0 V). Also, the source of the nMOS transistor M25 is connected to the drain of the nMOS transistor M23 (i.e., p-well portions of the nMOS transistor M21–M23), while the drain is connected to the reference voltage (0 V). Also, the source of the nMOS transistor M26 is connected to the output node OUT, while the drain is connected to the reference voltage (0 V) . Then, the gates of the nMOS transistors M24, M25, M26 are connected to a node ENB.

A signal enb to be inputted to the node ENB is a signal which controls the reset of this charge pump circuit, and which has two states, one being a state of the same voltage as the output voltage of this charge pump circuit and the other being a state of a voltage higher than that. Then, while the charge pump circuit is operating (in the steady state), the voltage of the signal enb becomes an output voltage Vneg, so that the nMOS transistors M24, M25, M26 turn into an OFF state. While the charge pump circuit is at a halt, on the other hand, the voltage of the signal enb becomes, for example, the power supply voltage Vcc. As a result of this, the nMOS transistors M24, M25, M26 are turned on, by which the node A, the p-well portion and the output node OUT in the pump cell 41 come to the GND level.

Like this, according to this embodiment, by the operation of the node reset circuit 42, the node A, the p-well portion and the output node OUT in the pump cell 41 immediately after the start-up of a boosting operation of the charge pump circuit are made to come to the same voltage, thus making it possible to realize a state modeled by Equation (3). Therefore, in whatever state the charge pump circuit is, the voltage of each node within the pump cell 41 is further prevented from rising higher than the voltage of the p-well portions of the N-channel transistors, so that the charge pump circuit can be further ensured for reliability.

Third Embodiment

The first and second embodiments have been described on a case where the present invention is applied to a negative-voltage charge pump circuit. In this embodiment, a description is made on a case where the invention is applied to a positive-voltage charge pump circuit. This positive-voltage charge pump circuit can be made up by replacing the nMOS transistors in the above-described negative-voltage charge pump circuit with pMOS transistors.

Figure 8:
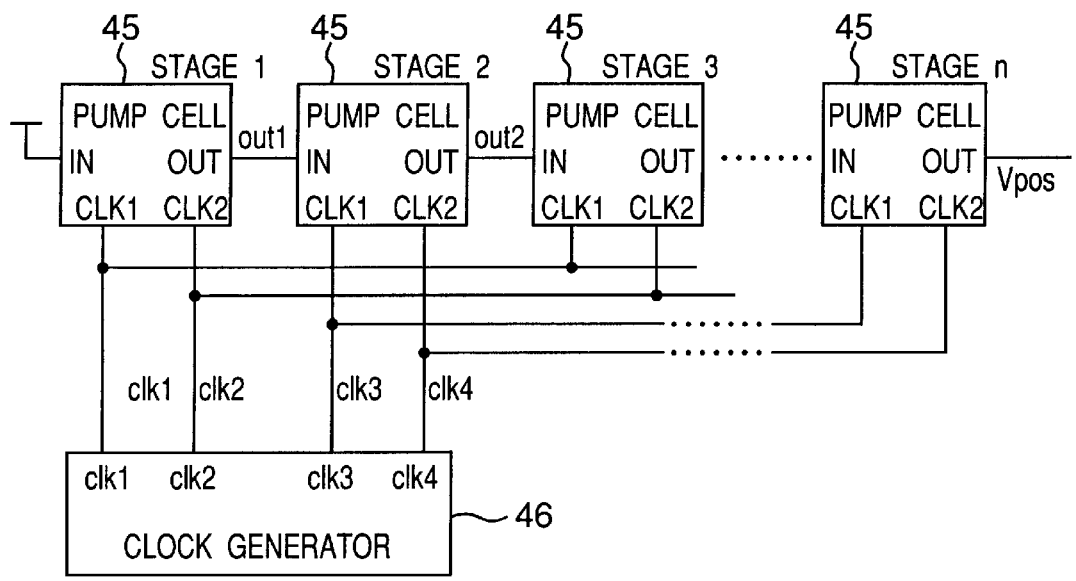
FIG. 8 is a circuit diagram of a positive-voltage charge pump circuit as another example of the present invention.
Figure 9:
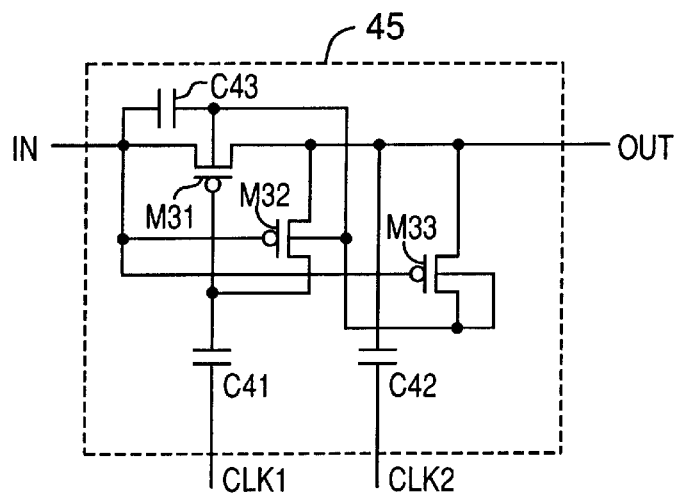
FIG. 9 is a circuit structure diagram of a pump cell to be used in the positive-voltage charge pump circuit shown in FIG. 8.

FIG. 8 is a circuit diagram of a positive-voltage charge pump circuit according to this embodiment. FIG. 9 shows a detailed circuit structure of a pump cell 45 in FIG. 8.

The positive-voltage charge pump circuit of this embodiment is made up by connecting the pump cells 45 of n stages in series to thereby obtain a positive voltage Vpos from a power supply voltage (Vcc) as shown in FIG. 8. Referring to FIG. 8, an input node IN of a left-end positioned first-stage pump cell (stage 1) 45 is connected to the power supply voltage (Vcc). An output node OUT, on the other hand, is connected to the input node IN of the second-stage pump cell (stage 2) 45. An output node OUT of the second-stage pump cell 45 is connected to an input node IN of a third-stage pump cell (stage 3) 45. Subsequent to this on, likewise, individual pump cells 45 are connected in the same manner, so that the positive voltage Vpos is outputted from the output node OUT of the n-stage pump cell (stage n) 45.

Figure 10:
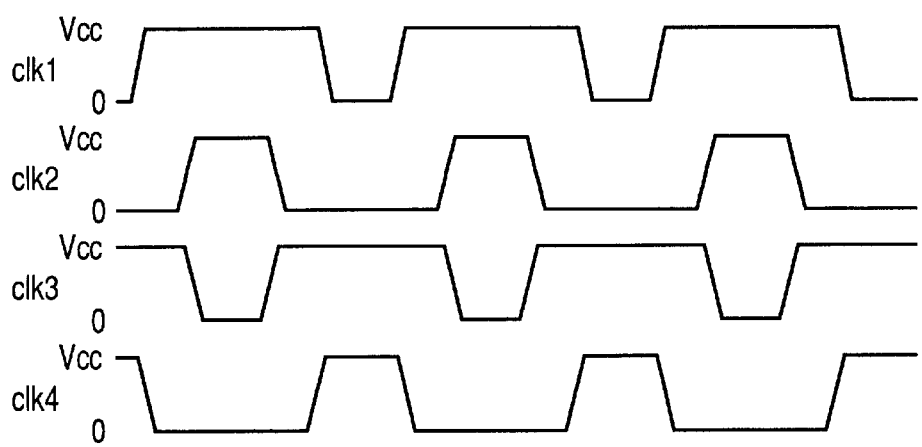
FIG. 10 is a diagram showing waveforms of clock signals fed to the charge pump circuit shown in FIG. 8.
Figure 11:
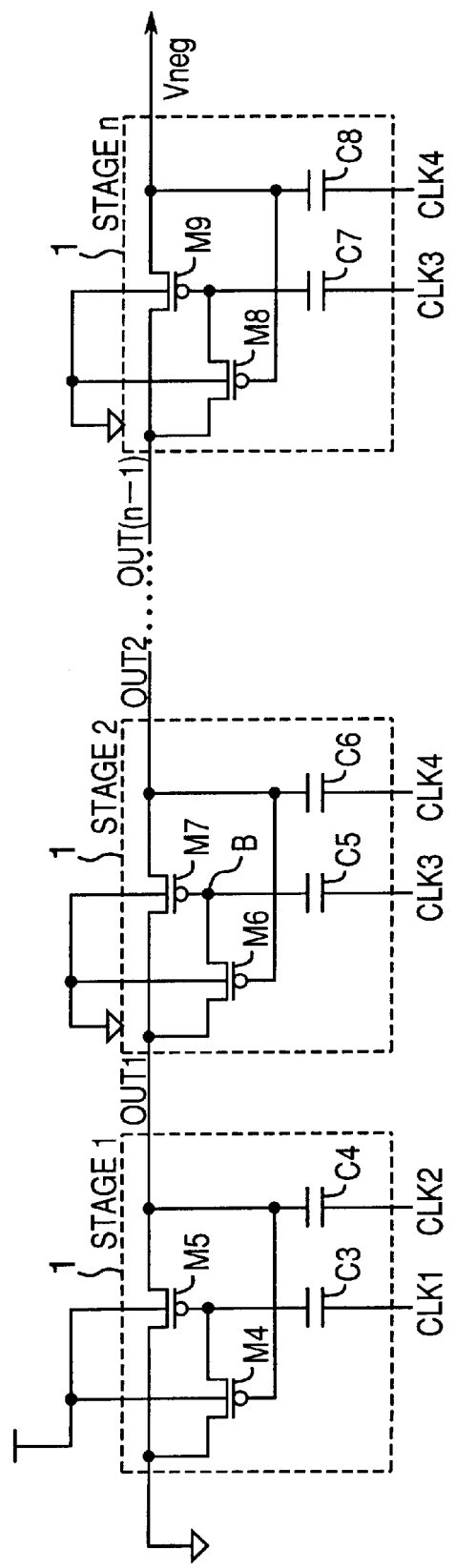
FIG. 11 is a circuit diagram of a negative-voltage charge pump circuit using P-channel transistors according to the prior art.
Figure 12:
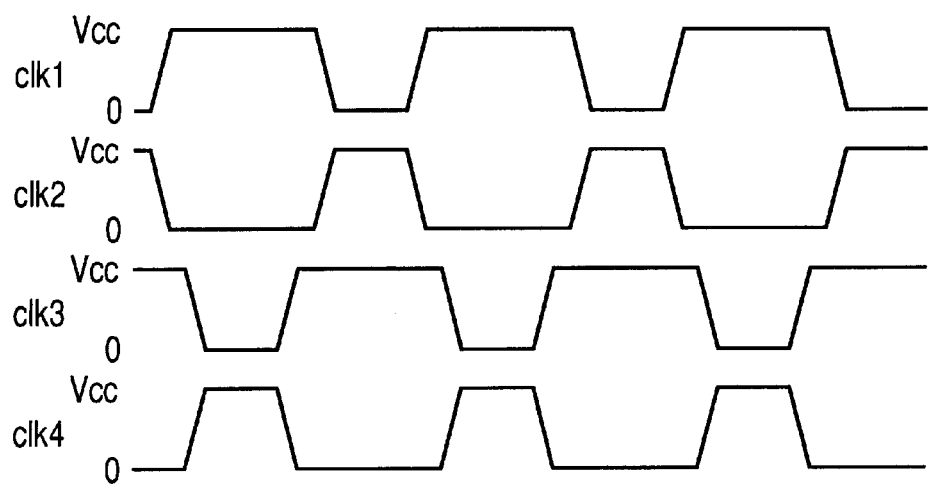
FIG. 12 is a diagram showing waveforms of clock signals fed to the charge pump circuit shown in FIG. 11.
Figure 13:
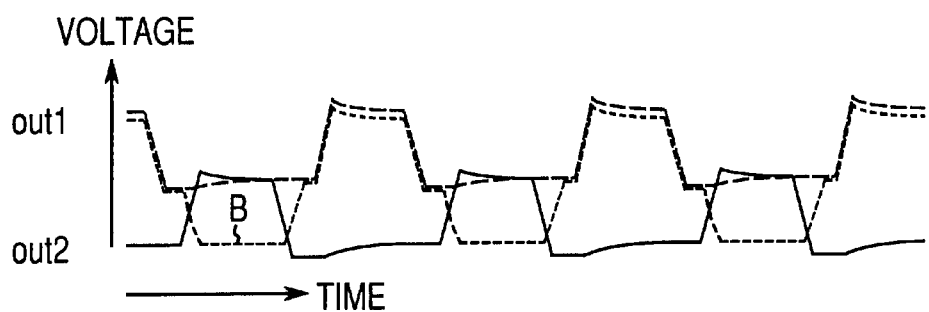
FIG. 13 is a diagram showing voltage waveforms of individual nodes in FIG. 11.
Figure 14:
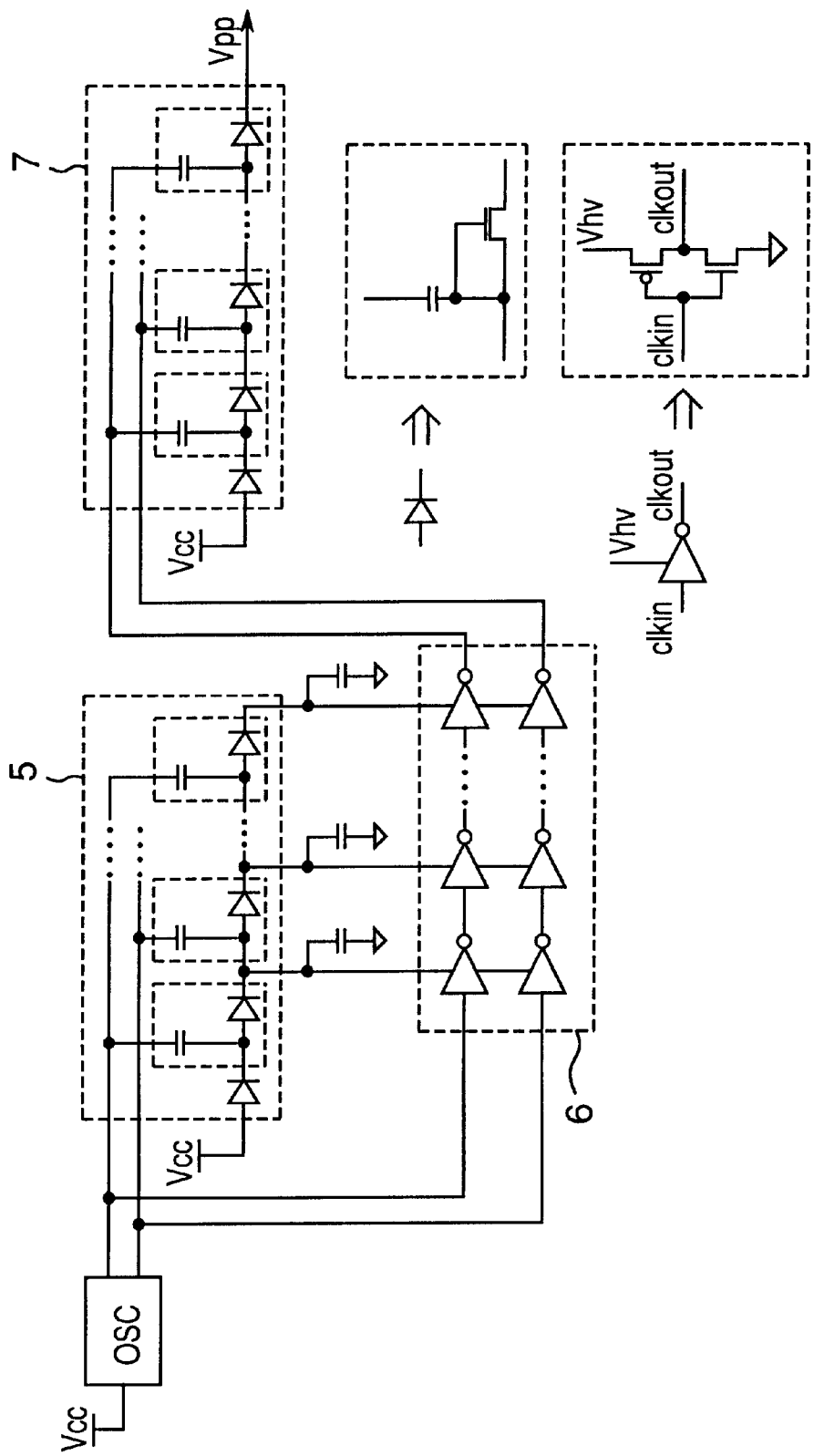
FIG. 14 is a circuit diagram of a negative-voltage charge pump circuit according to the prior art other than that of FIG. 11.
Figure 16:
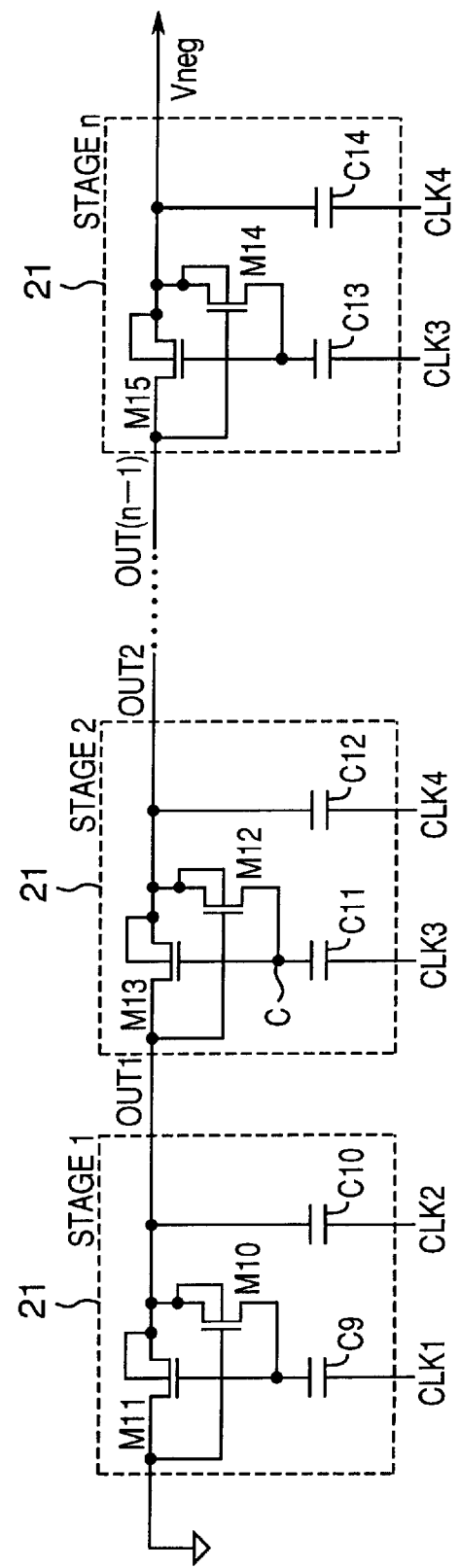
FIG. 16 is a circuit diagram of a negative-voltage charge pump circuit using N-channel transistors according to the prior art.
Figure 17:
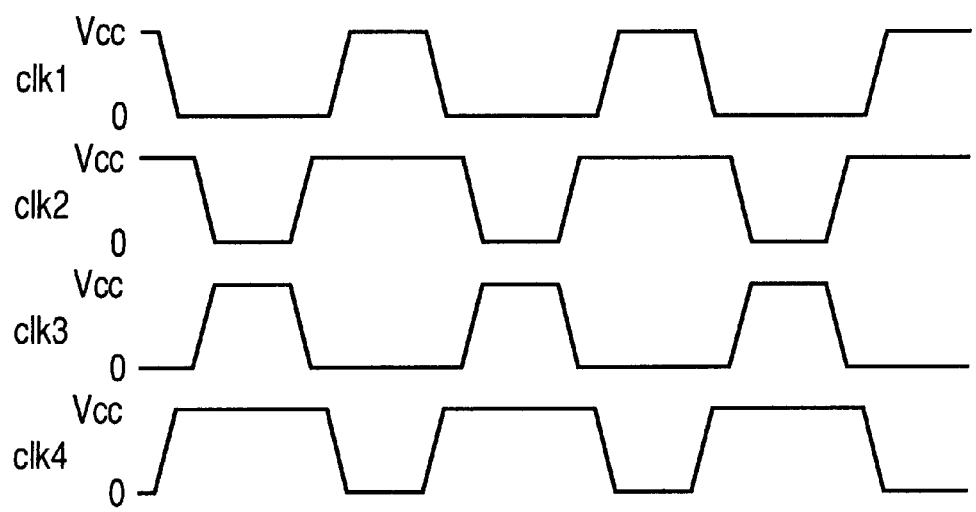
FIG. 17 is a diagram showing waveforms of clock signals fed to the charge pump circuit shown in FIG. 16.
Figure 18:
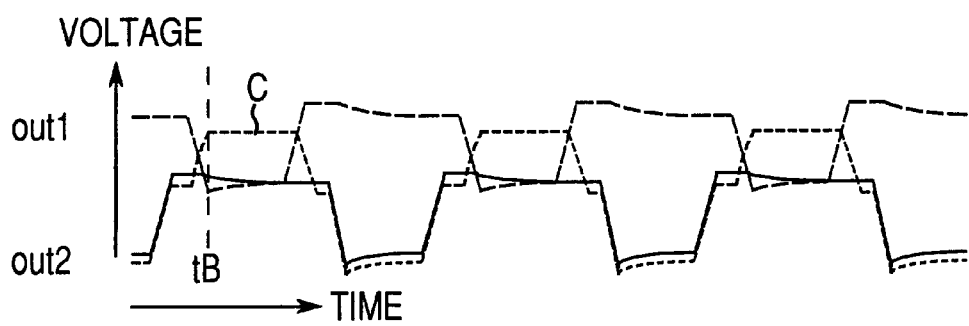
FIG. 18 is a diagram showing voltage waveforms of individual nodes in FIG. 16.

Next, a clock generator 46 generates four types of clock signals clk1–clk4 as shown in FIG. 10. The clock signals clk1, clk2 among these are inputted to the clock input nodes CLK1, CLK2 of pump cells 45 of odd-numbered stages, respectively. Also, the clock signals clk3, clk4 are inputted to the clock input nodes CLK1, CLK2 of pump cells 45 of even-numbered stages, respectively.

Next, the pump cell 45 is structured as shown in FIG. 9. More specifically, the input node IN is connected to drain of a pMOS transistor M31, gate of a pMOS transistor M32, gate of a pMOS transistor M33 and one electrode of an auxiliary capacitor C43. Also, source of the pMOS transistor M31, source of the pMOS transistor M32, source of the pMOS transistor M33 and one electrode of a capacitor C42 are connected to the output node OUT.

The other electrode of the capacitor C42 is connected to the clock input node CLK2. Also, the gate of the pMOS transistor M31 is connected to the drain of the pMOS transistor M32 and one electrode of a capacitor C41. The other electrode of the capacitor C41 is connected to the clock input node CLK1. Further, the drain of the pMOS transistor M33 is connected to the other electrode of the auxiliary capacitor C43, n-well portion of the pMOS transistor M31, n-well portion of the pMOS transistor M32 and n-well portion of the pMOS transistor M33 itself.

Operation of the pump cell 45 having the above structure may be understood by inverting the transition of the voltages of the clock signal clk, signal out1, signal out2 and the like shown in FIG. 4 in the first and second embodiments. Its description is omitted here.

Also in the case of the positive-voltage charge pump circuit in this embodiment, by setting the capacitance value of the auxiliary capacitor C43 in the same manner as in the case of the negative-voltage charge pump circuit of the first and second embodiments, the n-well voltage of each of the pMOS transistors M31–M33 can securely be made higher than the drain voltage and the source voltage of each transistor. Also, since the voltage difference between n-well voltage and source voltage in the transistor M31 can be suppressed to a minimum, it becomes possible to make up a positive-voltage charge pump circuit which is free from any deterioration of pump efficiency due to the backgating effect in lowering the power supply voltage, as well as from occurrence of any latch-up or charge leak and thus which is safe and highly reliable.

It is also possible to add a node reset circuit corresponding to the node reset circuit 42 shown in FIG. 7. The node reset circuit in such a case is one in which the nMOS transistors M24–M26 in the node reset circuit 42 shown in FIG. 7 are replaced with pMOS transistors. In this case, the signal enb inputted to the node ENB functions to turn on the pMOS transistors by a switching to the GND level for a halting state of the charge pump, and to turn off the pMOS transistors by a switching to the output voltage Vpos level of the positive-voltage charge pump circuit for an operating state of the charge pump. By so doing, the individual nodes within the pump cells 45 immediately after a start-up of positive voltage boosting operation can be made equal in voltage to one another by the node reset circuit.

The outputs Vneg and Vpos of the charge pump circuits in the above embodiments are applied to control gate of specified memory cells or the like according to an address signal or erase signal, for example, via a word decoder or eraser circuit of flash memory device, and used for programming or erasing of the memory cells. In this process, because the memory cells or the like become a load, the load capacity of the outputs Vneg and Vpos are generally large so that their output voltage waveforms are flattened.

Also, in the charge pump circuits shown in FIG. 2 and FIG. 8, pump cells 31, 41, 45 are connected only in series, whereas the pump cells 31, 41, 45 may also be connected in parallel in cases where further increase in the current feeding power or reduction in the output impedance is needed. The parallel connection means to connect corresponding nodes of a plurality of pump cells to each other, thereby achieving a parallelism. In such a case, the connection may be achieved not only by connecting outputs of each stage, but also by connecting only outputs of the final stage with the outputs of the individual preceding stages independent of one another. In addition, this parallel connection of pump cells is effective also in terms of design. For circuit design by CAD (Computer Aided Design), generally, libraries of designed logical cells are used for more efficient, more prompt design. Thus, if the design contents of the pump cells 31, 41, 45 of the circuit structure are registered in the library, design load can be reduced by designing the parallel connection of a plurality of pump cells with considerations given to necessary current feeding power, while any misdesigns can be prevented.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A charge pump circuit having a plurality of pump cells connected in series, wherein a pump cell of an odd-numbered stage executes a charge pump operation for an input voltage based on a first clock signal and a second clock signal while a pump cell of an even-numbered stage executes a charge pump operation based on a third clock signal and a fourth clock signal so that an output voltage resulting from boosting the input voltage is obtained, the pump cell being characterized in that:
drain of a first transistor and gate of a second transistor are connected to an input node;
source of the first transistor, source of the second transistor and one electrode of a first capacitor are connected to an output node;
drain of the second transistor and one electrode of a second capacitor are connected to a node connected to gate of the first transistor;
a clock input node to which one of the clock signals, whichever it is, is inputted is connected to the other electrodes of the first capacitor and the second capacitor;
one electrode of a third capacitor is connected to the input node;
a well portion of each transistor is connected to the other electrode of the third capacitor; and that
the pump cell is equipped with switching means for electrically connecting or cutting off the well portion and the output node to or from each other.

2. The charge pump circuit according to claim 1, wherein the pump cell further comprises:
voltage setting means for setting the input node, the output node, the node and the well portion to the same voltage when the charge pump circuit is out of operation.

3. The charge pump circuit according to claim 1, wherein the transistors constituting the pump cell are nMOS transistors.

4. The charge pump circuit according to claim 3, wherein the switching means operates in such a manner that:
when the voltage of the output node of the pump cell is lower than the voltage of the input node, the switching means electrically connects the well portion and the output node to each other; and when the voltage of the output node of the pump cell is higher than the voltage of the input node, the switching means electrically cuts off the well portion and the output node from each other so that the well portion is brought into a floating state.

5. The charge pump circuit according to claim 3, wherein a capacitance value of the third capacitor is so set that the voltage of the well becomes lower than the voltage of source and drain of all the transistors constituting the pump cell regardless of what is operational state of the pump cell.

6. The charge pump circuit according to claim 1, wherein the transistors constituting the pump cell are pMOS transistors.

7. The charge pump circuit according to claim 6, wherein the switching means operates in such a manner that:

when the voltage of the output node of the pump cell is higher than the voltage of the input node, the switching means electrically connects the well portion and the output node to each other; and when the voltage of the output node of the pump cell is lower than the voltage of the input node, the switching means electrically cuts off the well portion and the output node from each other so that the well portion is brought into a floating state.

8. The charge pump circuit according to claim 6, wherein a capacitance value of the third capacitor is so set that the voltage of the well becomes higher than the voltage of source and drain of all the transistors constituting the pump cell regardless of what is operational state of the pump cell.

9. The charge pump circuit according to claim 1, wherein at least one pump cell among the pump cells connected in series is connected in parallel with another pump cell having the same structure.

10. A charge pump circuit having at least one pump cell, wherein the pump cell has a structure that:

drain of a first transistor and gate of a second transistor are connected to an input node;

source of the first transistor, source of the second transistor and one electrode of a first capacitor are connected to an output node;

drain of the second transistor and one electrode of a second capacitor are connected to a node connected to gate of the first transistor;

a clock input node to which one of clock signals, whichever it is, is inputted is connected to the other electrodes of the first capacitor and the second capacitor;

one electrode of a third capacitor is connected to the input node;

a well portion of each transistor is connected to the other electrode of the third capacitor; and that switching means is provided for electrically connecting or cutting off the well portion and the output node to or from each other.

* * * * *